UNITED STATES PATENT OFFICE.

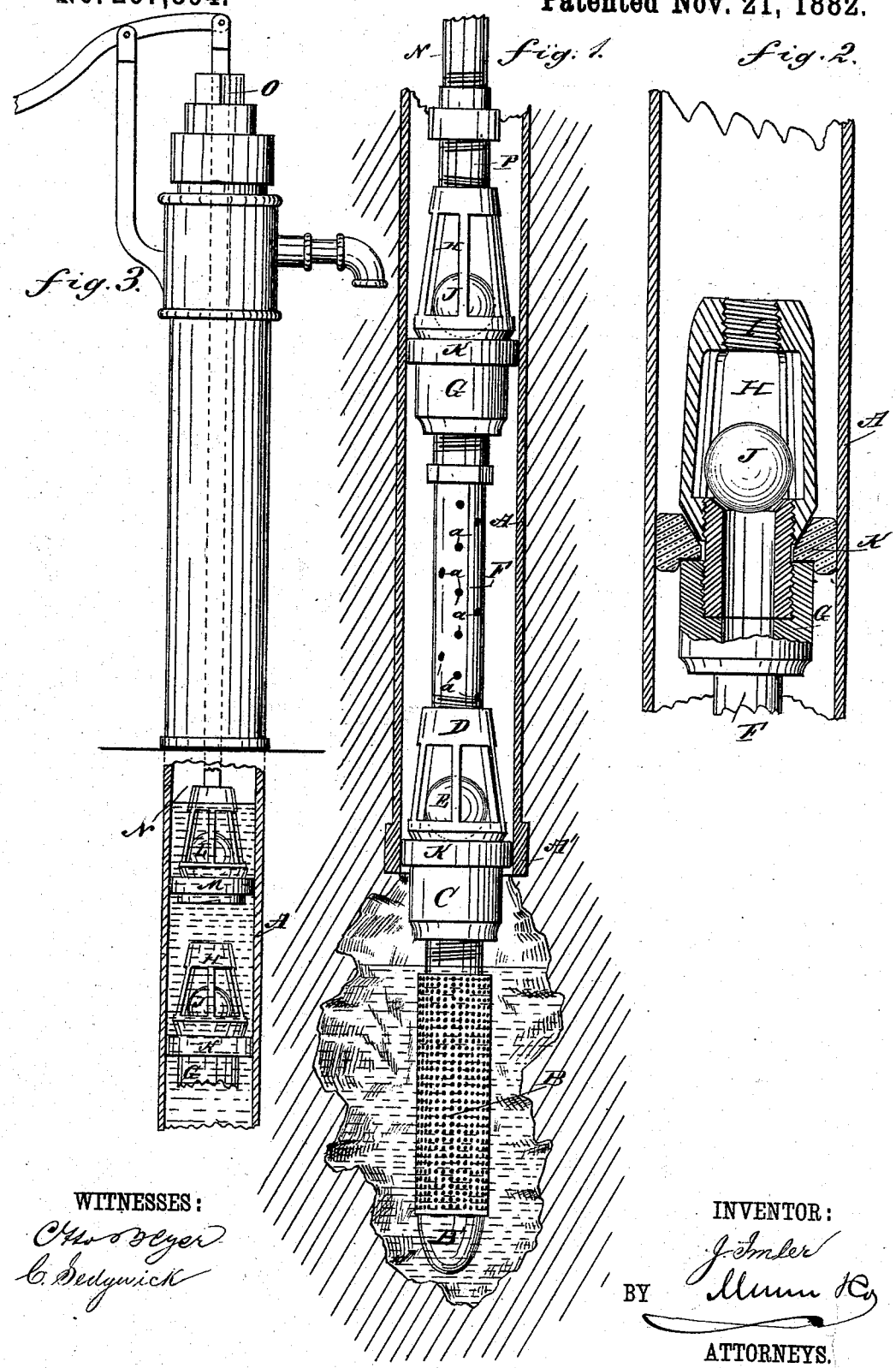

JOSEPH IMLER, OF FOREST, OHIO.

PUMP.

SPECIFICATION forming part of Letters Patent No. 267,894, dated November 21, 1882.

Application filed July 14, 1882. (No model.)

*To all whom it may concern:*

Be it known that I, JOSEPH IMLER, of Forest, Hardin county, Ohio, have invented a new and Improved Pump, of which the following is a full, clear, and exact description.

The object of my invention is to provide means whereby the point or section of the tube to which the strainer is attached may be introduced into the well after the tubing is inserted, and also to provide improved valves and seats which can be removed without removing the tubing.

Reference is to be had to the accompanying drawings, forming a part of this specification, in which similar letters of reference indicate corresponding parts.

Figure 1 is a longitudinal sectional elevation of the lower part of the tubing, containing the strainer and the improved valves. Fig. 2 is an enlarged detail sectional elevation through the upper valve-cage, and Fig. 3 is a longitudinal elevation of the pump-stock above the ground.

The pump-tubing A is driven into the ground, or lowered in some other suitable manner, until it has reached the desired depth, the lower end of this pump-tubing being protected by a steel collar, A', from being bent or battered by striking against the edges of the rocks.

The tubular strainer B, which is made of wire-netting or of perforated material, is provided at its lower end with a metal head, B', which protects the bottom of the strainer. The upper end of the strainer is screwed into the lower end of a collar, C, into the upper end of which a valve cage or basket, D, is screwed, which contains a ball-valve, E. Into the upper end of the basket or cage D a tube, F, is screwed, the upper end of which tube is screwed into the lower end of a collar, G. On the upper end of this collar G the lower end of a valve basket or cage, H, is screwed, which valve-basket contains a ball-valve, J. This basket H is provided at its upper end with an opening, I, provided with a left-hand screw-thread. A rubber packing-ring, K, is inserted between the lower beveled end of the basket H and the upper edge of the collar G, and a like packing-ring, K, is inserted between the lower beveled end of the basket D and the upper edge of the collar C. The tube F is provided throughout its entire length with a series of apertures, a. A sucker-valve, L, of the usual construction, and provided with a packing-ring, M, is attached to the lower end of the pump-rod N. The pump rod passes through a suitable stuffing-box, O, on the top of the pump-valve, so that this pump can be used as a force-pump.

The pump can be operated by hand or by machinery, as may be desired.

The operation is as follows: After the tube A is in place a short tube, P, is secured in the lower end of the pump-rod or sucker-rod N. The tube P has an outside left-hand thread at its lower end, and is screwed into the upper end of basket H. Then the united baskets D and H, the tube F, and the strainer B are passed down through the pump-tube until the bottom of the strainer rests on the bottom of the recess or opening below the lower end of the well-tube A. The baskets H and D are not screwed down firmly on the collars C and G, and by turning the pump-rod from right to left to unscrew the short pipe P from the upper basket, H, the baskets D and H will be screwed down on their collars C and G until the packing-rings K are spread to such an extent that the friction produced by the same on the sides of the tube A is so great that these packing-rings will hold the cages or baskets in the tube. As the end B' of the strainer B bears upon the bottom of the well, it will hold stationary the collar C, and after the basket D is screwed tight that, with the pipe F, will hold the collar G tight until the basket H has been screwed tightly into the last-mentioned collar. Then the short tube P unscrews from the upper end of the upper basket, H, and the baskets, the tube F, and the strainer B remain in the bottom of the well. The pump or sucker rod N is then withdrawn, and the sucker-valve L is attached to the lower end of the same, and is introduced into the bottom of the pump-tube, the length of this sucker-rod being so adjusted that the sucker-valve will not strike against the upper basket, H. The pump is then operated in the usual manner. The water enters through the strainer B, passes up in the same, raises the valve E, and passes into that part of the tube between the packing-rings K, and at the next operation of the sucker-valve it passes through the aperture

*a* into the pipe F, raises the upper valve, J, and at the next operation of the sucker-valve passes into the same, and is raised to the surface in the usual manner. I thus have two check-valves at the bottom of the well-tubing, both of the valves J and E serving as check-valves. If the water in the well-tube rises to a considerable height, the tube F is lengthened, so that the upper valve, J, will be a short distance below the surface of the water. If the water stands very low in the pump-tube, the tube F is shortened accordingly. If the check-valves and the strainer are to be removed, the sucker-rod is first removed, then the coupling-piece P is attached to the lower end of the sucker-rod, and is screwed into the upper cage, H, whereby the baskets H and D will be raised, the packing-rings K will be released, and then the check-valves and strainer can be withdrawn.

Having thus described my invention, I claim as new and desire to secure by Letters Patent—

1. The combination, with a pump-tube, of an intermediate check-valve placed between the sucker-valve and the bottom check-valve, and the perforated tube connecting this intermediate valve with the bottom check-valve, substantially as herein shown and described, and for the purpose set forth.

2. The combination, with a pump-tube, of an intermediate check-valve placed between the sucker-valve and the bottom check-valve, which intermediate valve is connected with the bottom check-valve by a perforated tube, and of a strainer attached to the bottom check-valve, substantially as herein shown and described, and for the purpose set forth.

3. The combination, with the pump-tube A, of the rubber collars K K, the cage D, carrying valve E, the side-perforated tube F, the collar G, and the valve J, whereby the water after passing the valve E must enter a chamber surrounding tube F, leading to the upper valve, as described.

4. The combination, with a pump-tube, of the valve-basket D and the valve-basket H, provided at its upper end with a left-hand-threaded aperture, I, the perforated tube F, connecting the valve-baskets D and H, and the strainer B, connected with the valve-basket D, substantially as herein shown and described, and for the purpose set forth.

5. The combination, with the pump-tube A, the valve-cages D H, the pipe F, and the collars C G, of the rubber rings K K, whereby the said rings may be so spread by screwing the cages into the collars as to hold both by friction in the tube, as described.

JOSEPH IMLER.

Witnesses:
HARVEY S. HORN,
JOHN W. DIRST.